United States Patent [19]

Sato et al.

[11] Patent Number: 4,667,786
[45] Date of Patent: May 26, 1987

[54] BLADE-BRAKE CLUTCH DEVICE FOR LAWN MOWER

[75] Inventors: Masatoshi Sato, Tokyo; Junichi Akaike, Chofu, both of Japan

[73] Assignee: Kioritz Corporation, Tokyo, Japan

[21] Appl. No.: 792,156

[22] Filed: Oct. 28, 1985

[30] Foreign Application Priority Data

Nov. 22, 1984 [JP] Japan ............................ 59-177365[U]

[51] Int. Cl.⁴ ............................................ F16D 67/02
[52] U.S. Cl. .................................. 192/17 R; 56/11.3; 192/12 R; 192/105 BA
[58] Field of Search ............... 192/17 R, 17 A, 17 C, 192/17 D, 12 R, 105 BA; 56/11.3

[56] References Cited

U.S. PATENT DOCUMENTS

| 2,180,469 | 11/1939 | Jaeger et al. | 192/17 R X |
| 3,026,665 | 3/1962 | Hoff | 192/17 R |
| 3,991,864 | 11/1976 | Muller | 182/105 BA |
| 4,369,616 | 1/1983 | Cody et al. | 56/11.3 |
| 4,565,268 | 1/1986 | Yamamoto et al. | 56/11.3 X |

*Primary Examiner*—Rodney H. Bonck
*Attorney, Agent, or Firm*—Browdy and Neimark

[57] ABSTRACT

A blade-brake clutch device of a lawn mower in which a brake drum of an internal expanding type brake and a clutch drum of a centrifugal type clutch are combined together with back to back relation and fixedly secured to a rotating shaft of a mower blade, there being provided a clutch boss member for holding clutch shoes of the centrifugal clutch and fixedly secured to an output rotating shaft of an engine of the lawn mower.

3 Claims, 2 Drawing Figures

4,667,786

BLADE-BRAKE CLUTCH DEVICE FOR LAWN MOWER

BACKGROUND OF THE INVENTION

1. Field of the Invention

This invention relates to a blade-brake clutch device for lawn mower which is provided between the engine of the mower and the rotating mower blade so that not only a rotating force can be transmitted from the engine to the blade but also the rotating force of the blade can be braked.

2. Description of the Prior Art

A conventional blade-brake clutch device for lawn mower generally comprises a disk brake or a hand brake as a braking means and a multi disk clutch as a clutching means.

According to such conventional blade-brake clutch device, there are found several problems or disadvantages. They include a large mounting space due to a relatively large size of the device and a possible poor durability of an output shaft of the engine which is positively connected to the mower blade by a multi disk clutch or the like, since such construction will inevitably lead to direct transmission of an impact force acting on the blade during the operation thereof and a braking force occurring during the braking operation of the mower respectively via the device to the said output shaft. An additional problem of insufficient braking force will also be found when a hand brake or the like is employed as the braking means.

SUMMARY OF THE INVENTION

This invention aims at providing a blade-brake clutch device for lawn mower which can eliminate the problems as mentioned above.

Accordingly, the present invention provides an improvement of the blade-brake clutch device wherein a brake of the internal expanding type which can not only be used with high reliability but also be easily available in the market is employed in such way that a brake drum of the said brake and a clutch drum of the centrifugal type be combined back to back and fixedly connected to a rotating shaft of the mower blade, and wherein the output shaft of the engine is fixedly connected to a clutch boss member which holds clutch shoes of the clutch of centrifugal type.

According to the blade-brake clutch device of the present invention, a positive braking force will be assured due to the employment of an internal expanding brake as the braking means. Moreover, by employing a centrifugal clutch, even when a sudden drop of revolution of the mower blade takes place owing, for example, to an impact force acting on the blade, to a force caused by the excessive biting of the grass or to a sudden operation of the brake during an emergency, the engine output rotating shaft will be prevented from being subjected to such excessive force that engine itself will be stopped, since the centrifugal clutch will be disconnected or caused to slip as the revolution of the clutch shaft is lowered by the above lowering of the revolution of the mower blade with a consequent drop or lowering of the revolution of the engine output shaft. Furthermore, by employing the construction in which the brake drum and the clutch drum are interconnected back to back, a small mounting space around the rotating axis of the device can be realized.

As mentioned above, the construction of the present invention will enable the device to be made, by using the members easily available from the market, in a compact form thus resulting in a reduction of the mounting space of the device. Moreover, an increased durability of the device can be achieved since the impact force acting on the mower blade will not be transmitted directly to the output rotating shaft of the engine.

DESCRIPTION OF THE PREFERRED EMBODIMENT

Figure 1:
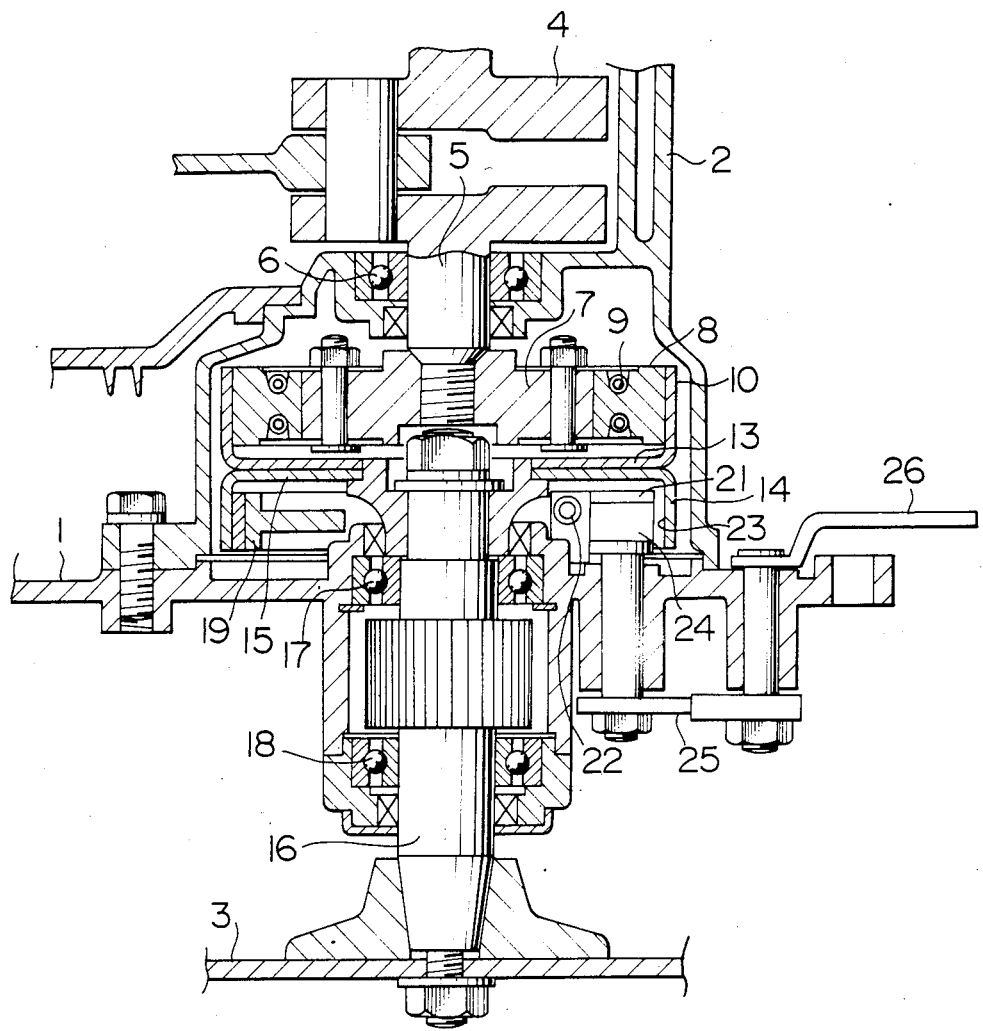
FIG. 1 is a vertical sectional view of an essential portion of the lawn mower incorporating a blade-brake clutch device according to the invention.
Figure 2:
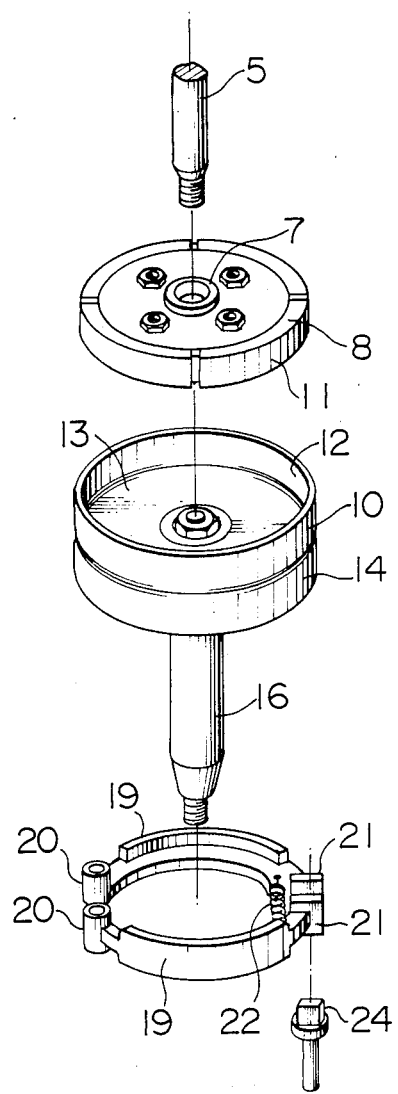
FIG. 2 is a perspective exploded view of the blade-brake clutch device shown in FIG. 1.

The embodiment shown in the drawings illustrates a lawn mower adapted to mow the lawn by a rotating mower blade 3 driven by an (internal combustion) engine 2 which is mounted on a body 1 supported and run by a driving wheel (not shown).

The internal combustion engine 2 is mounted on the body 1, and an output rotating shaft 5 of the engine 2 extends downwardly from a bearing 6 provided at an lower end of the engine 2 and supporting the output shaft 5. A lower end of the output shaft 5 rigidly mounts a clutch boss member 7. Four clutch shoes 8 are inserted to be held within the clutch boss member 7 along the peripheral portion thereof and respectively forced radially inwardly by means of springs 9. The clutch boss member 7 is received together with the shoes 8 within a clutch drum 10, there being normally provided an appropriate amount of clearance respectively between an external surface 11 of each shoe 8 and an internal surface 12 of the clutch drum 10. However, when the output shaft 5 reaches a predetermined revolutional speed after the engine 2 is started to rotate, each one of the shoes 8 is caused to move by an action of centrifugal force radially outwardly against the action of the spring 9 thus making a pressure contact of the external surface 11 with the internal surface 12 of the clutch drum 10 to transmit the rotational force of the boss member 7 to the clutch drum 10. Accordingly, it will be understood that the above clutch is formed as a kind of the so-called centrifugal clutches.

A base portion 13 of the clutch drum 10 and a base portion 15 of the brake drum 14 are located back to back and securely fixed together by welding. Below the output rotating shaft 5 the said clutch drum 10 and the said brake drum 14 are fixedly secured to the upper end of a rotating mower blade shaft 16 which is coaxially aligned with the output rotating shaft 5. The mower blade rotating shaft 16 is rotatably supported by a pair of bearings 17 and 18 which are mounted within the body 1, there being fixedly secured a rotating blade 3 on the lower end of the mower blade rotating shaft 16.

Within the brake drum 14 are provided a pair of brake shoes 19 having a circular arc configuration. Each of the brake shoes 19 is pivotably mounted at one end 20 to the body 1, and interconnected at the other free ends 21 by means of a tension spring 22 which biases the shoes 19 radially inwardly. Because of this biasing force the brake shoes 19 are normally separated from the internal surface 23 of the brake drum 14. Between the free ends 21 of the two brake shoes 19 there is provided a cam member 24. This cam member 24 is rotatably mounted on the body 1 and connected via a linkage means 25 to a lever 26. The lever 26 will be operated in an occasion in which, for example, the operator of the lawn mower finds his mower uncontrollable. When the lever 26 is operated, the cam member 24 will be rotated so as to expand the brake shoes 19 radially outwardly against the action of the tension spring 22 with the result that the respective brake shoe 19 is pressure contacted with the internal peripheral surface 23 of the brake drum 14, there being an instantaneous and positive braking effect on the rotating shaft 16 of the mower blade 3. This brake is a kind of the so-called internal expanding brakes. The impact force during the braking can be absorbed by the centrifugal clutch, and thus will not be directly transmitted to the output rotating shaft 5 of the engine 2.

What is claimed is:

1. Apparatus, disposed between an engine output shaft of a lawn mower and a rotating mower blade, for transmitting a rotational drive force from the lawn mower output shaft to the mower blade and selectively braking the rotation of the mower blade, said apparatus comprising:

selectively actuatable braking means, including a braking drum and brake shoes housed within said braking drum, centrifugal clutch means, including clutch shoes and a clutch drum in which said clutch shoes are housed, both said braking drum and said clutch drum having a base portion, said braking drum and said clutch drum being combined coaxially together in back to back relation at said base portions, and being fixedly secured to a rotating shaft carried by said mower blade, and a clutch boss member, for holding said clutch shoes of said centrifugal clutch means, fixedly secured to said output rotating shaft of said engine.

2. Apparatus, disposed between an engine output shaft and a rotatable member, for transmitting a rotational drive force from the engine output shaft to the rotatable member and selectively braking the rotation of the rotatable member, said apparatus comprising:

centrifugal clutch means including a clutch support member attached to said engine output shaft, and clutch shoes coupled to said clutch support member and supported for radial movement away from said clutch support member, braking means, including a brake support member secured to said rotatable member, and selectively actuatable brake shoes coupled to said brake support member, said brake shoes being displaceable radially outwardly of said brake support member, said braking means further including annular drum means having a first drum portion for housing said brake support member and for engaging said relatively displaceable brake shoes, a second drum portion for housing said clutch support member and for engaging said clutch shoes, and a partition dividing said first drum portion from said second drum portion, whereby rotation of said engine output shaft causes said clutch shoes of said centrifugal clutch means to move radially away from said clutch support member and into engagement with said second portion of said drum means such that said drum means rotates and said rotation of said engine output shaft is transmitted to said rotatable member, and means for selectively actuating said brake shoes to cause said brake shoes to stop the rotation of said drum means, whereby said rotatable member will stop rotating even though said engine output shaft continues to rotate.

3. The apparatus of claim 2, wherein said means for selectively actuating said brake shoes comprises camming means, located within said first drum portion and engageable with said brake shoes, for displacing said brake shoes radially outwardly of said brake support member, and an actuator member, located outside said first drum portion and coupled to said camming means, for causing said radial outward displacement of said brake shoes.

* * * * *